US00RE35991E

United States Patent [19]

Desmarais et al.

[11] E Patent Number: Re. 35,991

[45] Reissued Date of Patent: Dec. 15, 1998

[54] METHOD OF WELDING THERMOPLASTIC FILM

[75] Inventors: Claude Desmarais, Ville Mont-Royal; Richard Desmarais, St-Bruno, both of Canada

[73] Assignee: DF Albums Ltd., Longueuil, Canada

[21] Appl. No.: 949,954

[22] Filed: Oct. 14, 1997

Related U.S. Patent Documents

Reissue of:

[64] Patent No.: 5,449,428
Issued: Sep. 12, 1995
Appl. No.: 238,017
Filed: May 3, 1994

U.S. Applications:

[63] Continuation of Ser. No. 811,113, Dec. 20, 1991, abandoned, which is a continuation-in-part of Ser. No. 673,390, Mar. 22, 1991, abandoned.

[51] Int. Cl.[6] ..... B32B 31/24

[52] U.S. Cl. ..... 156/274.4; 156/380.3; 156/380.6

[58] Field of Search ..... 156/73.1, 272.2, 156/274.4, 275.1, 379.6, 380.2, 380.3, 380.4, 380.6; 525/222

[56] References Cited

U.S. PATENT DOCUMENTS

| | | | |
|---|---|---|---|
| 3,433,573 | 3/1969 | Holladay et al. | 525/222 X |
| 3,625,787 | 12/1971 | Radl et al. | 156/73.1 |
| 4,111,875 | 9/1978 | Uva | 523/167 |
| 4,112,989 | 9/1978 | Grode et al. | 383/127 |
| 4,425,268 | 1/1984 | Cooper | 524/110 |
| 4,451,536 | 5/1984 | Barlow et al. | 428/383 |
| 4,457,960 | 7/1984 | Newsome | 428/35 |
| 4,725,473 | 2/1988 | Van Gompel et al. | 428/156 |
| 4,877,663 | 10/1989 | Kambe et al. | 428/35.5 |
| 4,877,827 | 10/1989 | Van Der Groep | 524/477 |
| 4,950,347 | 8/1990 | Futogawa | 156/272.4 |
| 4,981,231 | 1/1991 | Knight | 215/341 |

FOREIGN PATENT DOCUMENTS

| | | |
|---|---|---|
| 865996 | 7/1978 | Belgium . |
| 0259246 | 3/1988 | European Pat. Off. . |
| 0437152 | 7/1991 | European Pat. Off. . |
| 1550731 | 12/1968 | France . |
| 2330606 | 6/1977 | France . |

OTHER PUBLICATIONS

World Patent Index Latest, Section Ch, Week 23, Class A, AN 81–41002D, Apr. 1981.

Notification of Transmittal of the International Search Report and International Search Report, Jun. 1992.

*Primary Examiner*—James Sells

*Attorney, Agent, or Firm*—Goudreau Gage Dubuc & Martineau Walker

[57] ABSTRACT

A method of welding at least two layers of a thermoplastic film which comprises a copolymer or copolymer-polymer mixture selected from the group consisting of ethylenevinylacetate (EVA) copolymer, an EVA copolymer and polyethylene, an EVA copolymer and polypropylene, and an EVA copolymer and polyethylene and polypropylene, with the proviso that the concentration of vinylacetate in said film is from about 12 to about 28% by weight, said method comprising the steps of:

pressing said at least two layers of said thermoplastic film;

applying a high frequency current to said pressed layers in order to weld said layers together; and recovering said welded layers.

9 Claims, No Drawings

METHOD OF WELDING THERMOPLASTIC FILM

Matter enclosed in heavy brackets [ ] appears in the original patent but forms no part of this reissue specification; matter printed in italics indicates the additions made by reissue.

This is a continuation of application Ser. No. 07/811,113, filed on Dec. 20, 1991, now abandoned, which was abandoned upon the filing hereof which is a continuation-in-part of Ser. No. 07/673,390, filed Mar. 22, 1991, now abandoned.

FIELD OF THE INVENTION

The present invention is directed to a method of welding, by high frequency or ultrasonic vibrations, an environmentally friendly thermoplastic material, said material being particularly suitable as a replacement for high frequency welding of polyvinyl chloride containing materials.

BACKGROUND OF THE INVENTION

In the past decade, the concern of governments for ecology and environment has become one of the top, if not the top priority. In the United States, 80% of all trash is being landfilled, the remaining 20% being split between incineration and recycling. However, landfilling has its limits, and soon, incineration and recycling will become the best, if not the only way of disposing of trash.

Governments throughout the world have enacted legislation concerning the use and disposal of wastes, and it is likely that upcoming environmental laws will be more strict and rigid against any kind of pollution.

Accordingly, the great challenge of industries in almost every field is to keep on producing goods at reasonable costs, while meeting environmental criteria more strict and the plastic industry is no exception.

At present, many items manufactured from plastic materials are generally made of polyvinyl chloride (PVC). PVC is a versatile material, but has serious environmental drawbacks. Incineration of PVC produces chlorinated dibenzofurans, chlorinated dibenzodioxins, and hydrochloric acid gas. It is now of common knowledge that dioxins and furans have been linked to diseases such as immunosystem failure, cancer, and birth defects. Also, hydrochloric acid is a powerful corrosive substance, and when combined with atmospheric moisture, it significantly contributes to acid rain.

Since PVC materials also contain to, tic additives such as heavy metals used as stabilizers and plasticizers, disposal of these coverings by landfilling is highly undesirable because these additives are slowly leached by water, and thus dispersed in the soil. Most of these stabilizers are considered carcinogenic.

The use of these stabilizers has also led to bans on PVC incineration, and has raised questions concerning the acceptance of products containing PVC that could eventually end up in waste.

Many governments have already banned either production and/or importation of PVC materials in their countries and this has lead to a race between manufacturers to find a non-toxic substitute for PVC which can be welded at high frequency. This represents a tremendous task. Plastic manufacturers are investing important amounts of money at every level to develop a new thermoplastic material suitable for high frequency welding which would overcome all the serious drawbacks of PVC. In this research, many requirements must be met.

The new thermoplastic material must be produced competitively while meeting the desirable performance requirements. The process leading to the final product should be susceptible to efficient continuous production operations. The thermoplastic material should also be strong enough to withstand stretching without the creation of holes, tears, or non-uniform zones of stretching.

The processing of PVC or similar materials into sheets involves extremely expensive machinery and the challenge is to develop a thermoplastic material which can, on one hand, be processed into sheets with existing machinery, and on the other hand, be converted into consumer goods by using the currently available machinery, especially such machines which use high frequency welding methods. Generally, the PVC materials are welded by high frequency, and the replacing thermoplastic material must also be capable of being welded by high frequency in any subsequent operation, and that represents the key step leading to the final consumer good.

Finally, the thermoplastic material should be easily recyclable, or in the alternative, should cause little damage to the environment when incinerated. The present invention fulfills all the above requirements.

SUMMARY OF THE INVENTION

In accordance with the present invention, there is provided a method of welding at least two layers of a thermoplastic film which comprises a copolymer or copolymer-polymer mixture selected from the group consisting of ethylenevinylacetate (EVA) copolymer, an EVA copolymer and polyethylene, an EVA copolymer and polypropylene, and an EVA copolymer and polyethylene and polypropylene, with the proviso that the concentration of vinylacetate in said film is from about 12 to about 28% by weight, said method comprising the steps of:

pressing said at least two layers of said thermoplastic film;

applying a high frequency current to said pressed layers in order to weld said layers together; and recovering said welded layers.

For convenience purposes, the above described film will be referred to as EVA film throughout the specification.

In an aspect of the invention, the EVA film comprises an ethylenevinylacetate copolymer (EVA) and a polymer selected from the group consisting of polyethylene (PE), polypropylene (PP) and mixtures thereof, with the proviso that the concentration of vinylacetate in the film is from about 12 to about 28% by weight.

Preferably, the amount of vinylacetate in the EVA film is from about 14% by weight to about 2.5% by weight and more preferably, about 19% by weight.

In another aspect of the present invention, the layers of the thermoplastic film described above can be welded by ultrasonic vibrations.

The EVA film used in the method of the present invention may also contain one or more additives such as a color concentrate, a slip, a filler, an anti-block agent and the like

DETAILED DESCRIPTION OF THE INVENTION

In accordance with the present invention, there is provided a method of welding at least two layers of a thermoplastic film which comprises a copolymer or copolymer-polymer mixture selected from the group consisting of ethylenevinylacetate (EVA) copolymer, an EVA copolymer and polyethylene, an EVA copolymer and polypropylene, and an EVA copolymer and polyethylene and polypropylene, with the proviso that the concentration of vinylacetate in said film is from about 12 to about 28% by weight, said method comprising the steps of:

pressing said at least two layers of said thermoplastic film;

applying a high frequency current to said pressed layers in order to weld said layers together; and recovering said welded layers.

The term "polyethylene" is meant to include high density polyethylene (HDPE), low density polyethylene (LDPE) and linear low density polyethylene (LLDPE) and the like, with the LLDPE being preferred.

The term "polypropylene" is meant to include polypropylene homopolymer, polypropylene copolymer, polypropylene terpolymer and the like, with the polypropylene terpolymer being preferred.

The expression "high frequency welding" is synonymous of radio frequency welding, and the meaning of these expressions is well known in this art. The frequency used in the high frequency welding, or radiofrequency welding is of about 27 MHz.

All the polymers or copolymers used in the method of the invention are commercially available on the market. As an example of such polymers that may be mentioned: linear low density polyethylene polymer #11D1, manufactured and sold by DuPont Canada; ethylenevinylacetate copolymer #2803M, manufactured and sold by At Plastics; polypropylene homopolymer JY 6100, manufactured and sold by Shell Canada; polypropylene copolymer XSV 622, manufactured and sold by Himont; polypropylene terpolymer RA061, manufactured and sold by Himont; low density polyethylene, manufactured and sold by Nova Corporation under the trade mark NOVAPOL 2FO219-A; and high density polyethylene HDPE 36156, manufactured and sold by Dow Chemical.

As an example of suitable EVA films that can be used in the method of the present invention, there may be mentioned those comprising from about 42 to 100% by weight of EVA copolymer having a vinylacetate content of 28% by weight, about 0 to 58% by weight of polyethylene, and from about 0 to 58% by weight of polypropylene. Preferably, the film comprises from about 42 to about 73% of EVA copolymer having a vinylacetate content of about 28%, about 27 to about 58% of polyethylene, and/or about 27 to 58% of polypropylene.

It should be appreciated that an EVA copolymer having a vinylacetate content of about 12 to about 28% by weight can be used alone. However, because of the present high cost of EVA copolymer, it is preferable that it be in admixture with other cheaper polymers such as polyethylene and polypropylene, in order to produce consumer goods having a competitive price.

Currently, the processing of PVC material into a marketable item such as, for example, a protective covering for ring binders or wallets for carrying cheque books and other manufactured goods involves the extrusion of PVC into a film having the desired thickness. The PVC film is then processed in a machine adapted to weld at least two layers of said film around an object to be protected such as cardboard, or to weld at least two layers of said film for making other types of manufactured goods like garbage bags, food storage bags and the like, the layers being then welded by high frequency, which also preferably involves a simultaneous cutting step to discard unwanted material. Heat welding can also be used instead of high frequency welding. However, from a commercial and industrial point of view, high frequency welding is much faster and efficient.

A conventional apparatus for carrying out the method of high frequency welding of the present invention comprises at least a press and means for welding at high frequency. Many types of high frequency welding apparatus are available on the market, such as COLPITT, KIEFEL, COSMOS, HISEN and the like. It should therefore be kept in mind that the method of the present invention can be performed on any of the these machines.

In more details, the method of the present invention comprises applying pressure onto at least two layers of an EVA film defined above by using a press preferably equipped with a heatable plate. The temperature of the plate can vary from about room temperature to as high as possible, as long as the film does not start to melt, thus causing it to stick to the plate. In other words, the highest possible temperature of the plate is the melting point of the composition of the film to be welded. Preferably the plate is heated around 70°–80° C. because it allows a shorter welding time, and requires less energy for welding.

The pressure applied is function of the thickness of the film, or the number of layers of said film. It is highly desirable to apply such pressure in order to obtain effective welding. Usually, the operator of the high frequency welding apparatus is well aware of the optimal pressure to be applied.

Some, but not all, high frequency welding apparatus are equipped with a pre-welding time option which permits an improved settlement of the film to be welded, as well as the application of a more uniform pressure on the film, prior to high frequency welding. Though not essential, such pre-welding operation is recommended to obtain better results.

Subsequently, the layers are welded by high frequency at a frequency of about 27 MHz, which is the usual frequency provided in high frequency welding apparatus. The welding time is also function of numerous parameters, such as the type of press (hydraulic, air etc . . . ), the thickness of the layers welded, the temperature of the plate etc. . . . Again, the operator of the high frequency apparatus is well aware of these requirements, and can determine the optimal conditions to maximize the method resulting in a satisfactory weld.

The high frequency welding step is preferably followed by a cooling period in order to allow the newly welded layers to cool down, and the weld to strengthen before the press is removed.

Finally, the excess of material, if any, is stripped, providing the finished goods.

The high frequency welding step described above can also be replaced by an ultrasonic vibration welding step. As an example of a suitable ultrasonic vibrations welding apparatus, there may be mentioned the Mach Sonic type SWP-14A. Obviously, other conventional ultrasonic vibrations welding apparatus may be used, such as King Ultrasonic Mach. etc. . . .

The user is usually equipped with the machine that serves his purposes, which can be other than welding the thermoplastic films disclosed in the present application. It should also be mentioned that the ultrasonic vibrations welding step is performed at room temperature.

In developing a thermoplastic substitute for PVC, two critical issues had to be considered. First, the substitute must be non-toxic for the environment, with mechanical properties at least similar or superior to current PVC coverings; and second, it is obviously imperative that the covering material be weldable by high frequency in similar conditions.

The thermoplastic substitute film should also possess the following highly desirable characteristics:

the stripping: the conventional method for high frequency welding involves the simultaneous "cutting" of the excess of material by a cutting dye present in the same matrix. The excess of material is then "stripped" manually without tearing;

the rigidity: the film should have a good resistance to torsion and shearing;

cold crack: since the goods containing a protective covering may be submitted to low temperatures, for example, a ring binder forgotten in a car in the winter time, the covering should possess properties such that it will remain flexible even after being submitted to low temperatures. Furthermore, the weld should not be affected or altered;

fatigue: items such as ring binders containing a covering or wallets for cheque books, are opened and closed hundreds of times. It is therefore essential that the covering material and the weld be resistant to cracks caused by fatigue.

The thermoplastic EVA film used in the method of the present invention complies with all the above requirements, and in some instances, has unexpectedly superior properties and advantages over PVC. Extrusion of the composition into a film is carried in a conventional manner with standard equipment well known in this field of the art. The thickness of the resulting sheet or film can be adjusted at will, depending on its intended use and the limits of the extruding machine. Typically, it varies from about 0.008 to about 0.022 inches.

Many techniques other than extrusion are available to the skilled workman for obtaining an EVA film suitable for the method of the present invention. However, the extrusion is preferred.

The chemical properties of the EVA film and its combustion products resulting from incineration have been analyzed. Also, the mechanical properties of consumers' goods containing at least two layers of an EVA film welded in accordance with the method of the present invention, for example, a ring binder, have been extensively evaluated.

Upon analysis, it has been found that the EVA layer or film used in the method of the present invention is free of heavy metals such as Ba, Cd, Cr, Se and Hg, and also free of halogen atoms, whereas some PVC samples show up to 2450 ppm of Ba, 1240 ppm of Ba, and 480 ppm Cr. Furthermore, incineration of the EVA film leads to water and $CO_2$, which are obviously non-toxic products.

PVC materials contain phthalates used as plasticizers for enhancing the cold crack resistance of the covering. These chemicals are highly toxic for humans and the environment, and their incineration may give dibenzodioxins and dibenzofurans, well known for their high level of toxicity.

The cold crack temperature of PVC is about −20° C., whereas the cold crack temperature of a protective ring binder covering prepared with the EVA film is lower than −55° C.

A fatigue test has been carried out in the following manner: a ring binder protected with a covering consisting of two layers of the EVA film welded by high frequency with a cardboard inserted in between, was placed on an apparatus allowing opening and closing of said binder. A similar experiment was carried out with a PVC covered ring binder. After 2500 cycles, the PVC binder was severely damaged, whereas the other binder covered with the EVA film remained intact after 80 000 (eighty thousand) cycles.

The EVA film may also contain a color concentrate, such as, for example, blue concentrate #4PPP201 manufactured and sold by Resco Colors Ltd. Any other suitable color concentrate can be used in said film, as long as the high frequency welding properties are not impaired.

Other additives such as a slip used to lower the coefficient of friction, a filler used to enhance the rigidity of the film, an anti-block agent used to lower the interfacial blocking properties and the like, can also be added in the film. An example of a slip is Erucamide, manufactured and sold by Canada Colors. An example of a filler is talc manufactured and sold by Canada Colors. An example of an anti-block agent is silica, manufactured and sold by Canada Colors.

The concentration of each of these additives is determined by the intended use of the finished goods. It must be kept in mind, however, that the concentration should neither alter the weldability of the EVA film, nor the resistance of the weld between two or more layers of the film.

The following examples are provided to illustrate the present invention rather than limit its scope.

EXAMPLE 1

The following products are blended together:

68% by weight of ethylenevinylacetate copolymer (EVA), #2803M, manufactured and sold by At Plastics, wherein the content of vinylacetate is 28%;

28% by weight of LLDPE #11D1, manufactured and sold by DuPont Canada; and

4% by weight of color concentrate #4PPP201, manufactured and sold by Resco Colors Ltd., having a polypropylene homopolymer content of about 60% by weight.

This blend is melted, giving a composition containing 19% by weight of vinylacetate. The melted composition is then extruded in a conventional manner with standard extruding equipment to produce a film having a thickness of approximately 0.008 inches. Depending on the intended use, the thickness can be adjusted as desired.

EXAMPLE 2

High Frequency Welding

A cardboard is placed between two layers of the film prepared in Example 1, and processed through a high frequency welding machine COLPITT Serial Number 902216, under the following experimental conditions:

temperature of the plate: 75° C.

pressure applied: 40 bar frequency: approximately 27 MHz amplitude: 9.5 pre-welding time: 0.5 second welding: 2.0 second cooling time: 0.2 second anode current: between about 1 to about 2 amperes grid current: about 0.5 ampere to lead to the desired binder after the mounting of suitable rings.

The amplitude is the last parameter adjusted on the high frequency welding apparatus. This feature is not present in every apparatus, but when it is, it allows a better free tuning.

It is to be noted that the anode current and the grid current indicate whether the tuning of the apparatus is adequate. In other words, once all the other parameters are adjusted, the anode current should be between 1 and 2 amperes, and the grid current should be around 0.5 in order to obtain satisfactory high frequency welding of the EVA film.

EXAMPLE 3

Proceeding in the same manner as in Example 1, the following compositions were prepared and extruded to provide a film. The values listed in the table are in % by weight. For films 4 to 44, the EVA used had a vinylacetate content of 28% by weight.

| FILM # | EVA | LLDPE | LDPE | HDPE | PP1 | PP2 | PP3 | PP4 | % VA |
|---|---|---|---|---|---|---|---|---|---|
| 1 | 100 | | | | | | | | 10 |
| 2 | 100 | | | | | | | | 28 |
| 3 | 100 | | | | | | | | 40 |
| 4 | 42.86 | 53.14 | | | | | | 4 | 12 |
| 5 | 42.86 | | 53.14 | | | | | 4 | 12 |
| 6 | 42.86 | | | 53.14 | | | | 4 | 12 |
| 7 | 42.86 | | | | 53.14 | | | 4 | 12 |
| 8 | 42.86 | | | | | 53.14 | | 4 | 12 |
| 9 | 42.86 | | | | | | 53.14 | 4 | 12 |
| 10 | 50 | 46 | | | | | | 4 | 14 |
| 11 | 50 | | 46 | | | | | 4 | 14 |
| 12 | 50 | | | 46 | | | | 4 | 14 |
| 13 | 50 | | | | 46 | | | 4 | 14 |
| 14 | 50 | | | | | 46 | | 4 | 14 |
| 15 | 50 | | | | | | 46 | 4 | 14 |
| 16 | 57 | 39 | | | | | | 4 | 16 |
| 17 | 57 | | 39 | | | | | 4 | 16 |
| 18 | 57 | | | 39 | | | | 4 | 16 |
| 19 | 57 | | | | 39 | | | 4 | 16 |
| 20 | 57 | | | | | 39 | | 4 | 16 |
| 21 | 57 | | | | | | 39 | 4 | 16 |
| 22 | 64 | 32 | | | | | | 4 | 18 |
| 23 | 64 | | 32 | | | | | 4 | 18 |
| 24 | 64 | | | 32 | | | | 4 | 18 |
| 25 | 64 | | | | 32 | | | 4 | 18 |
| 26 | 64 | | | | | 32 | | 4 | 18 |
| 27 | 64 | | | | | | 32 | 4 | 18 |
| 28 | 68 | | 28 | | | | | 4 | 19 |
| 29 | 68 | | | 28 | | | | 4 | 19 |
| 30 | 68 | | | | 28 | | | 4 | 19 |
| 31 | 68 | | | | | 28 | | 4 | 19 |
| 32 | 68 | | | | | | 28 | 4 | 19 |
| 33 | 713 | 24.5 | | | | | | 4 | 20 |
| 34 | 71.5 | | 24.5 | | | | | 4 | 20 |
| 35 | 71.5 | | | 24.5 | | | | 4 | 20 |
| 36 | 71.5 | | | | 24.5 | | | 4 | 20 |
| 37 | 71.5 | | | | | 24.5 | | 4 | 20 |
| 38 | 71.5 | | | | | | 24.5 | 4 | 20 |
| 39 | 72.7 | 23.3 | | | | | | 4 | 22 |
| 40 | 72.7 | | 23.3 | | | | | 4 | 22 |
| 41 | 72.7 | | | 23.3 | | | | 4 | 22 |
| 42 | 72.7 | | | | 23.3 | | | 4 | 22 |
| 43 | 72.7 | | | | | 23.3 | | 4 | 22 |
| 44 | 72.7 | | | | | | 23.3 | 4 | 22 |

note:
PP1 = polypropylene homopolymer
PP2 = polypropylene copolymer
PP3 = polyproplene terpolymer
PP4 = color concentrate
% VA = % of vinylacetate in the film.

EXAMPLE 4

Proceeding in the same manner as in Example 1, a film having the following composition was prepared:

68% by weight of ethylenevinylacetate copolymer (EVA), #2803M, manufactured and sold by At Plastics, wherein the content of vinylacetate is 28%;

4% by weight of color concentrate #4PPP201, manufactured and sold by Resco Colors Ltd., having a polypropylene homopolymer content of about 60% by weight;

2.5% of slip master batch which is a 5% by weight dispersion of erucamide in an appropriate carrier; and 25.5% of a mixture comprising 40% by weight of talc and 60% by weight of LLDPE.

This film provided excellent results under high frequency welding and ultrasonic vibrations welding in accordance with the present invention.

EXAMPLE 5

Two layers of films 28 to 31 as listed in Example 3, each layer having a thickness of about 0.013 inch, are processed through an ultrasonic vibrations welding machine Mach Sonic type SWP-14A at a 15 KHz frequency under the following conditions:

| Film | Welding delay (sec.) | Power delay (sec.) | Welding time (sec.) | Hold (sec.) | $P_1$ (kg/cm$^2$) | $P_2$ (kg/cm$^2$) |
|---|---|---|---|---|---|---|
| 28 | 0.3 | 0.35 | 0.25 | 0.5 | 2 | 5 |
| 29 | 0.3 | 0.35 | 0.30 | 0.5 | 2 | 5 |
| 30 | 0.3 | 0.35 | 0.35 | 0.5 | 2 | 5 |
| 31 | 0.3 | 0.35 | 0.40 | 0.5 | 2 | 5 |

$P_1$ corresponds to the pressure applied initially by the horn on the layers at time = 0, and $P_2$ is the pressure applied during the welding.

ANALYSIS OF THE FILMS

Each film obtained in Example 3 was submitted to evaluation of several mechanical properties that are:

easiness of welding by high frequency and ultrasonic vibrations stripping rigidity cold crack weld resistance fatigue resistance It is to be understood that the films were tested especially for protective covering purposes of consumer goods, and therefore, evaluated as such. Accordingly, the criteria of evaluation might be different depending on the intended use, for example, a food storage bag or a garbage bag.

In order to determine a range of accessibility, films #1 and 3 consisted in an EVA copolymer alone with a concentration of vinylacetate of 10 and 40% by weight respectively.

The film #1 cannot be welded by high frequency or ultrasonic vibrations, and therefore, no further evaluation of this film was carried out.

The composition of film #3 cannot be extruded at all. Accordingly, the first results indicated that the concentration of vinylacetate in the film must be higher than 10% and lower than 40% by weight.

The film #2 gave excellent results in all the tests, except for the rigidity, which was rather poor for the intended use, that is protective covering.

In a general manner, films 2 and 4 to 44 possess significantly higher fatigue resistance over similar PVC sheets, as well as a much lower cold crack temperature.

The rigidity of the film slightly decreases with the increase of the concentration of vinylacetate in the film. On the other hand, the easiness of welding, either by high frequency or ultrasonic vibrations, the stripping and the weld resistance increase significantly with the increase of concentration of vinylacetate.

Considering all the de-sired characteristics, films 27 to 34 and the film of Example 1, wherein the concentration of vinylacetate in the film is from 18 to 20%, have given the more preferred film for performing the method of the present invention.

We claim:

1. A method of high frequency welding together layers of a thermoplastic film comprising vinylacetate in a concentration of about 12 to 28% by weight of said thermoplastic film and a [copolymer or] copolymer-polymer mixture selected from the group consisting of:

[an ethylenevinylacetate EVA copolymer,]

an *ethylenevinylacetate* EVA copolymer and polypropylene, an EVA copolymer and polyethylene, and an EVA copolymer and polypropylene and polyethylene, the method comprising the steps of:

a) pressing together layers of said thermoplastic film between solid surfaces;

b) applying a high frequency electromagnetic wave energy to said pressed layers so as to effect high frequency welding together of said layers, said film being capable of being welded by high frequency wave-energy without requiring the application of heat to said layers of said film prior to high frequency welding said layers; and c) releasing said pressure on said layers, cooling said layers and recovering said welded layers.

2. The method of claim 1 wherein the concentration of vinylacetate in said thermoplastic film is from 14 to 25% by weight of said thermoplastic film.

3. The method of claim 1 wherein the concentration of vinylacetate in said thermoplastic film is about 19% by weight of said thermoplastic film.

4. The method of claim 1 wherein said thermoplastic film comprises:

(*a*) 42 to [100%] *73%* by weight of an EVA copolymer comprising about 28% by weight of vinylacetate *and*

[0 to 58% by weight of polyethylene, and optionally 0 to 58% by weight of polypropylene]

(*b*) *up to* 58% by weight of polyethylene or polypropylene.

5.The method of claim 1 wherein said thermoplastic film comprises:

42 to 73% by weight of an EVA copolymer comprising about 28% by weight of vinylacetate, 27 to 58% by weight of polyethylene, and optionally 27 to 58% by weight of polypropylene.

6. The method of claim 1 wherein said method comprising the additional step of warming said solid surfaces in order to accelerate the time required for high frequency welding of said layers.

7. The method of claim 5 wherein said thermoplastic film comprises one or more additives selected from the group consisting of a slip agent, an anti-block agent, and a filler.

8. The method of claim 5 wherein said thermoplastic film has a thickness of about 0.008 to 0.022 inches.

9. The method claim 5 wherein said high frequency wave energy is applied at a frequency of about 27 MHz.

* * * * *